(12) United States Patent
Veugen

(10) Patent No.: US 12,067,129 B2
(45) Date of Patent: Aug. 20, 2024

(54) PRIVACY PRESERVING COMPUTATION PROTOCOL FOR DATA ANALYTICS

(71) Applicant: Flytxt B.V., Nieuwegein (NL)

(72) Inventor: Thijs Veugen, The Hague (NL)

(73) Assignee: FLYTXT B.V., Nieuwegein (NL)

( * ) Notice: Subject to any disclaimer, the term of this patent is extended or adjusted under 35 U.S.C. 154(b) by 336 days.

(21) Appl. No.: 16/017,617

(22) Filed: Jun. 25, 2018

(65) Prior Publication Data

US 2018/0373882 A1 Dec. 27, 2018

(30) Foreign Application Priority Data

Jun. 23, 2017 (EP) .................................. 17177653

(51) Int. Cl.
G06F 21/60 (2013.01)
H04L 9/00 (2022.01)
(Continued)

(52) U.S. Cl.
CPC ............ G06F 21/602 (2013.01); H04L 9/008 (2013.01); H04L 9/085 (2013.01); H04L 9/0869 (2013.01);
(Continued)

(58) Field of Classification Search
CPC ..... G06F 21/602; H04L 9/085; H04L 9/0838; H04L 9/0841; H04L 9/0844;
(Continued)

(56) References Cited

U.S. PATENT DOCUMENTS

| | | | | |
|---|---|---|---|---|
| 6,182,214 B1 * | 1/2001 | Hardjono | ................ | H04L 9/085 380/255 |
| 7,787,619 B2 * | 8/2010 | Nadooshan | ............. | H04L 9/085 713/180 |

(Continued)

FOREIGN PATENT DOCUMENTS

| | | |
|---|---|---|
| WO | 2013066176 A1 | 5/2013 |
| WO | 2013066177 A1 | 5/2013 |

OTHER PUBLICATIONS

"Neumann et al., Analysis of Security and Cryptographic Approaches to Provide Secret and Verifiable Electronic Voting, Conference: Design, Development, and Use of Secure Electronic Voting Systems, 2014, pp. 1-32" (Year: 2014).*

(Continued)

*Primary Examiner* — Oleg Korsak
(74) *Attorney, Agent, or Firm* — Steven M. Koehler; Westman, Champlin & Kochler, P.A.

(57) ABSTRACT

A method for privacy-preserving computation of aggregated private data of a group of client devices comprises: a server selecting at least t devices; being provided with key information including an encryption key e and a decryption key of a homomorphic threshold cryptosystem; obtaining a random value $r_i$ and being provided with the random values of the other devices in the group; the server transmitting client indices identifying selected devices, and signalling a device for aggregate encrypted data of each of the selected devices; the server receiving randomized encrypted data and an associated decryption share from each selected device, the decryption shares being configured such that decryption key d can be reconstructed on the basis of t decryption shares; and, the server aggregating the received randomized encrypted data of the selected devices using the homomor- (Continued)

phic properties and using the decryption shares for decrypting the aggregated randomized encrypted data into cleartext.

19 Claims, 6 Drawing Sheets

(51) Int. Cl.
    *H04L 9/08*           (2006.01)
    *H04L 9/14*           (2006.01)
    *H04L 9/30*           (2006.01)
(52) U.S. Cl.
    CPC ............... *H04L 9/14* (2013.01); *H04L 9/302* (2013.01); *H04L 9/3026* (2013.01); *H04L 2209/46* (2013.01)
(58) Field of Classification Search
    CPC ......... H04L 9/0869; H04L 9/14; H04L 9/302; H04L 9/3026; H04L 9/008; H04L 2209/46
    See application file for complete search history.

(56) References Cited

U.S. PATENT DOCUMENTS

| | | | | |
|---|---|---|---|---|
| 7,933,414 | B2* | 4/2011 | Bauchot | H04N 7/1675 380/279 |
| 8,229,939 | B2* | 7/2012 | Staddon | G06F 21/6227 280/255 |
| 8,515,058 | B1* | 8/2013 | Gentry | H04L 9/008 380/28 |
| 8,520,855 | B1* | 8/2013 | Kohno | G06F 21/602 380/277 |
| 9,253,171 | B2* | 2/2016 | Neumann | H04L 63/062 |
| 9,660,813 | B1* | 5/2017 | van Dijk | H04L 63/0853 |
| 9,942,034 | B2* | 4/2018 | Le Saint | H04L 9/0825 |
| 10,069,631 | B2* | 9/2018 | Rane | H04L 9/085 |
| 10,289,835 | B1* | 5/2019 | Machani | H04L 9/0894 |
| 10,516,527 | B1* | 12/2019 | Machani | H04L 9/0625 |
| 10,853,828 | B2* | 12/2020 | Wilson | G06N 20/00 |
| 11,341,269 | B2* | 5/2022 | Veugen | H04L 9/008 |
| 11,461,795 | B2* | 10/2022 | Jain | G06Q 30/0202 |
| 11,900,236 | B2* | 2/2024 | Dalli | G06N 5/045 |
| 2003/0147535 | A1* | 8/2003 | Nadooshan | H04L 9/085 380/277 |
| 2008/0152149 | A1* | 6/2008 | Bauchot | H04L 63/064 380/279 |
| 2009/0077379 | A1* | 3/2009 | Geyzel | H04L 9/085 713/170 |
| 2009/0119518 | A1* | 5/2009 | Staddon | G06F 21/6227 713/193 |
| 2010/0257111 | A1* | 10/2010 | Veugen | G06Q 20/045 705/318 |
| 2011/0283099 | A1* | 11/2011 | Nath | H04L 9/008 713/150 |
| 2012/0204026 | A1* | 8/2012 | Shi | H04L 9/3006 713/168 |
| 2012/0243687 | A1* | 9/2012 | Li | H04L 9/085 380/277 |
| 2012/0331283 | A1* | 12/2012 | Chandran | H04L 9/088 713/150 |
| 2013/0083921 | A1* | 4/2013 | Fujisaki | H04L 9/0847 380/44 |
| 2014/0380036 | A1* | 12/2014 | Neumann | H04L 9/0869 713/150 |
| 2015/0113276 | A1* | 4/2015 | Day | H04L 9/0819 713/171 |
| 2015/0149767 | A1* | 5/2015 | Oualha | H04W 12/065 726/3 |
| 2016/0241389 | A1* | 8/2016 | Le Saint | H04L 9/0844 |
| 2017/0124348 | A1* | 5/2017 | Pourzandi | G06F 21/602 |
| 2017/0207917 | A1* | 7/2017 | Davis | H04L 63/045 |
| 2017/0235969 | A1* | 8/2017 | Kamara | G06F 16/284 713/159 |
| 2017/0272246 | A1* | 9/2017 | Rane | H04L 9/30 |
| 2017/0353855 | A1* | 12/2017 | Joy | H04W 12/02 |
| 2018/0367298 | A1* | 12/2018 | Wright | H04L 9/0861 |
| 2018/0373882 | A1* | 12/2018 | Veugen | H04L 9/3026 |
| 2019/0007205 | A1* | 1/2019 | Corduan | H04L 63/062 |
| 2019/0014094 | A1* | 1/2019 | Le Saint | H04L 63/0428 |
| 2020/0366459 | A1* | 11/2020 | Nandakumar | H04L 9/008 |
| 2020/0403781 | A1* | 12/2020 | Gentry | G06F 21/602 |
| 2022/0131698 | A1* | 4/2022 | Badrinarayanan | H04L 9/30 |

OTHER PUBLICATIONS

"Damgard et al., A Generalisation, a Simplification and some Applications of Paillier's Probabilistic Public-Key System, 2000, BRICS, pp. 1-21" (Year: 2000).*
"Desmedt et al., Threshold Cryptosystem, 1990, Advances in Cryptology, pp. 307-315" (Year: 1990).*
"Fuyou et al., Randomized Component and Its Application to (t,m,n)-Group Oriented Secret Sharing, 2015, Transactions on Information Forensics and Security, pp. 1-11" (Year: 2015).*
"Peacock et al., Verifiable Voting Systems, 2013, Computer and Information Security Handbook, pp. 293-312" (Year: 2013).*
"Susilo et al., Efficient dynamic threshold identity-based encryption with constant-size ciphertext, 2016, Theoretical Computer Science, pp. 49-59" (Year: 2016).*
"Bonawitz et al., Practical Secure Aggregation for Privacy-Preserving Machine Learning, Mar. 30, 2017, pp. 1-21" (Year: 2017).*
Shoup V. et al, "Securing Threshold CryptoSystems Against Chosen Ciphertext Attack", Journal of Cryptology, Springer, New Yrok, NY, US, vol. 15, No. 21, Jan. 1, 2002 (Jan. 1, 2002), pp. 75-96, XP001112787, ISSN: 0933-2790.
Communication from the European Patent Office for European patent No. 18179667.3, mailed Oct. 18, 2019.
Anselmi et al., Unsupervised learning of invariant representations with low sample complexity: the magic of sensory cortex or a new framework for machine learning.
Damgard et al., "Unconditionally secure constant-rounds multi-party computation for equality, comparison, bits and exponentiation", In: Halevi, S., Rabin, T. (eds.) TCC 2006, LNCS, vol. 3876, pp. 285-304. Springer, Heidelberg.
Desmedt and Y. Frankel, "Threshold cryptosystems", Crypto 1989, p. 308-315, Springer-Verlag.
Erkin, et al, "Generating private recommendations efficiently using homomorphic encryption and data packing", IEEE Trans. Inform. Forensics Secur. 7(3), 1053-1066, 2012.
Erkin et al., in IEEE International Workshop on Information Forensics and Security, "Privacy-preserving user clustering in a social network", IEEE, Washington, 2009.
Extended European Search Report issued in corresponding European Application No. 17210886.2, mailed Sep. 13, 2018.
Heap, "Permutations by Interchanges", Computer Journal., vol. 6, No. 3, Nov. 1, 1963 (Nov. 1, 1963), pp. 293-298.
Kargupta et al, in ICDM, IEEE Computer Society, "On the privacy preserving properties of random data perturbation techniques", IEEE, Washington, 2003, pp. 99-106.
Kacprzyk, "Group decision making with a fuzzy linguistic majority", Fuzzy Sets Syst, 18, 105-118, 1986.
Kononchuk Dmitry et al, "Privacy-Preserving User Data Oriented Services for Groups with Dynamic Participation", (Sep. 9, 2013), Medical Image Computing and Computerassisted Intervention—Migcai 2015 : 18th International Conference, Munich, Germany, Oct. 5-9, 2015; Proceedings; [Lecture Notes in Computer Science; Lect.Notes Computer], Springer International Publishing, CH.
Veugen et al, "Improved privacy of dynamic group services", EURASIP Journal on Information Security, Biomed Central Ltd, London, UK, vol. 2017, No. 1, (Feb. 1, 2017), pp. 1-9.
Mathes, Folksonomies "Cooperative classification and communication through shared metadata", Comput. Mediated Commun. 47, 1-28, 2004). nr. 10.
F Anselmi et al., "Unsupervised learning of invariant representations with 35 low sample complexity: the magic of sensory cortex

(56) References Cited

OTHER PUBLICATIONS or a new framework for machine learning?" Theor. Comput. Sci. 633(C), 112-121 (2016). CBMM, MIT, arXiv:1311.4158v5), Collective decision-making.

B. Schoenmakers and P. Tuyls, "Practical Two-Party Computation based on Conditional Gate," ASIACRYPT 2004, Lecture Notes in Computer Science 3329 (2004) 119136.

Ivan Damgard et al., "A Generalisation, a Simplication and Some Applications of Pailler's Probabilistic Public-Key System" In: "Lecture Notes in Computer Science", Jun. 5, 2001 (Jun. 5, 2001), Springer Berlin Heidelbergg, Berlin, Heidelberg, XP055148869, ISSN: 0302-97-42; ISBN: 978-3-54-045234-0, vol. 1992, pp. 119-136.

European Search Report and Written Opinion for European Patent Application No. EP 17177653, filed Jun. 23, 2017, mailed Jan. 9, 2018.

Fuyou Miao et al., "Randomized Component and Its Application to (t, m, n)-Group Oriented Secret Sharing", IEEE Transactions on Information Forensics and Security, IEEE, Piscataway, NJ, US, vol. 10, No. 5, May 1, 2015 (May 1, 2015), pp. 889-899, XP011577142, ISSN: 1556-6013.

Desmedt Y et al.: "Threshold Cryptosystems", Advances in Cryptology. Santa Barbara, Aug. 20-24, 1989; [Proceedings of the Conference on Theory and Applications of Cryptology], New York, Pringer, US, vol. 435, Aug. 20, 1989 (Aug. 20, 1989), pp. 307-315, XP002295910.

Parno et al., "Pinocchio: Nearly Practical Verifiable Computation", Communications of the ACM (2016) vol. 59 Issue 2: 103-112.

Catalano et al., "Homomorphic Signatures with Efficient Verification for Polynomial Functions", J.A. Garay and R. Gennaro (Eds): CRYPTO 2014, Part I, LNCS 8616: 371-389, International Association for Cryptologic Research, 2014.

\* cited by examiner

PRIVACY PRESERVING COMPUTATION PROTOCOL FOR DATA ANALYTICS

The discussion below is merely provided for general background information and is not intended to be used as an aid in determining the scope of the claimed subject matter.

FIELD OF THE INVENTION

Aspects of the invention relate to a privacy preserving computation protocol for data analytics, and, in particular, though not exclusively, to methods and system for privacy preserving data computations, a client device and server device for privacy preserving data computations and a computer program product for using such method.

BACKGROUND OF THE INVENTION

Data analytics techniques are increasingly used by commercial, governmental and academic organizations to make decisions or to verify or disprove (scientific) models, theories or hypotheses. Data analytics use mathematical algorithms to process data, often privacy sensitive data, in order to derive useful correlations in large raw data sets. The data processing may include one or more computations, e.g. one or more arithmetical operations such as addition or multiplication, of the private data. The processed private data may offer descriptive, predictive or even prescriptive insights about a group of people, organisations or companies and thus are of substantial commercial value.

For example, a voting organisation is interested in efficiently and securely obtaining an accumulated result of the voting data of a group of voters. Providing such information electronically via the Internet would be a very cheap and efficient way to process such information, however such scheme would only be accepted by the public if the privacy of the individual users is respected. Similarly, when testing and researching medicines and pharmaceutical products, tests results of individual patients from hospitals (which may include genetic data) need to be aggregated and parties may only have access to aggregated (e.g. average) test results such that the privacy of the individual patient is respected.

In many situations however people or organisations are reluctant to provide private data to third parties over the Internet. Moreover, the often strict legislation on data privacy put companies at risk both legally and in reputation if fraud or a privacy breach has occurred. For such reasons, applications such as electronic online voting schemes, which could potentially make voting schemes, such as government elections, much simpler, efficient and cheaper, are still not generally accepted.

More generally, legislators may be willing to allow commercial organisations to use personal data in data analytic applications if the organisations can provide a certain trust that the privacy can be preserved. Hence, there is a need for privacy preserving techniques which enable organizations to share results of data analytics without disclosing the data (hereafter referred to as private data) that were used in the processing.

A typical data analytics application may include client devices (e.g. a smart phone comprising an application for data collection at the client side) provided to a group of n users. Each client device may be adapted to collect user input $m_i$, i.e. private data of user i, and send the data to a server that is adapted to communicate with the client devices in order to process, e.g. add or multiply, the data of different client devices, while preserving the privacy of the individual users.

The server may run a server application that is adapted to process private data in accordance with a set of privacy and security rules. These rules may e.g. include that it is not allowed to learn the private data of each client device, but only the aggregated result. The rules may further include that client devices are not allowed to learn each other's inputs. Additionally, in some cases the client devices may also be able to verify that the aggregator will use the private data for a predetermined computation. Such server may hereafter be referred to as an aggregator server.

Verifiable computation is a known technique that enables a computer, typically a client device, to verify arbitrary computations outsourced to a server. An example of such technique is described in the article by Parno et al, Pinocchio: *Nearly Practical Verifiable Computation*, IEEE Symposium on Security and Privacy, 2013. This technique however assumes that the inputs of the computation usually belong to the same user. Additionally, the computation that needs to be verified is fixed. Usually however it is not known in advance which user inputs an aggregator would like to aggregate. Verifiable computation is therefore less suitable for situations that require the aggregation of private data from a random selection of client devices from a large group of client devices, i.e. situations that are typical for big data analytics applications.

Another technique that allows verification of computations by a server is known as homomorphic verifiable signatures. An example of this technique is described in the article by Catalano et al, *Homomorphic signatures with efficient verification for polynomial functions*, CRYPTO 2014 and enables certain operations, e.g. arithmetic operations, in the encrypted domain with signed user inputs and produces a signature of the output by combining the input signatures. The output signature can be used by the client device to verify that the correct computation has been executed. This technique may be combined with encryption, which requires the use of a public key. If an aggregator needs to decrypt the aggregated message, a private key is needed, but in that case all user inputs could be decrypted by the aggregator. Such scheme usually requires a public key infrastructure in which each client device is provided with his own key pair. Such scheme puts quite a burden on computational and communication resources of a client device.

Hence, there is a need in the art for improved methods and systems for privacy preserving data computation. In particular, there is a need in the art for methods and systems that enable a server to efficiently aggregate privacy sensitive data while the privacy of the persons associated with the data is preserved.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the background.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In an aspect, the invention may relate to a method for privacy-preserving computation of aggregated private data of a group of client devices comprising. The method may include a server selecting t client devices or at least t client devices from the group of client devices, wherein each client device in the group: is identifiable by client index i; comprises an encryption function; is provided with key information including an encryption key e and a decryption key d of a homomorphic threshold cryptosystem; generates or is provided with an random value $r_i$ and has access to, or is provided with, the random values of the other client devices in the group. Further, the method may include the server transmitting client information to each selected client device, the client information including client indices identifying the selected client devices, the client information signalling a client device that the server would like to aggregate encrypted private data of each of the selected client devices; the server receiving randomized encrypted private data and an associated decryption share from each selected client device, the decryption shares being configured such that decryption key d can be reconstructed on the basis of t decryption shares; and, the server aggregating, preferably summing or adding, the received randomized encrypted private data of the selected client devices using the homomorphic properties of the cryptosystem and using the decryption shares to decrypt the aggregated randomized encrypted private data into cleartext.

Hence, the privacy-preserving protocol allows a server, preferably an aggregation server, to decrypt the aggregated amount of private data of individual client devices only if the aggregation server complies with the promise of the aggregation server to exactly aggregate the private data of (at least) t client devices. The user is able to check whether the group of client devices selected by the aggregation server is sufficiently large in order to guarantee that the aggregation server is not able to derive information from the individual user clients. Embodiments of the invention can provide a very efficient privacy-preserving protocol in terms of traffic signalling as it can be implemented in a request-response type scheme wherein the request includes the client indices of the selected group and the response includes the encrypted user input and a decryption share.

Embodiments of the invention are particularly useful for big data analytics applications, including but not limited to the online or cloud-based processing of medical data, e.g. processing of clinical data or medical records of patients, processing data of voting and secret ballot schemes, processing metrics in television and multimedia applications (e.g. audience ratings of channel usage in television broadcast or streaming applications), processing of financial data of commercial and/or institutional organisations, etc.

Additionally, if the aggregation server selects t client devices, then all client devices within this group have the guarantee that the private data that they sent as cipher text parts to the aggregation sever are used in the aggregation process. Hence, in that case, no computational expensive zero-knowledge-proof computations are required in order to provide proof that the private data are taken into account by the aggregation server. Moreover, the secure protocol only requires one communication round between the client devices and the aggregation server.

To enable the aggregation server to identify individual client devices, the client information may include client identifiers $\{CD_i\}$ for uniquely identifying each client device. A client device may be associated with an index i, preferably a countable index i, (i.e. a quantity which can take on a set of integer values and is used to designate one out of a number of possible values associated with this value). This index may hereafter be referred to as a client index. It allows a server to select of a subgroup H of client devices from a group G of n client devices and signal client devices of the selected subgroup.

For example, group G may be associated with client indexes i $\{1, 2, \ldots, 30\}$ and a selection of a subgroup H of 7 client devices may be signalled by selecting, e.g. randomly, seven client indices $\{3,5,10,11,15,29\}$.

In a further embodiment, a binary vector of n elements $b_i$ (i=1, ..., n) may be used to signal selection of subgroup H of client devices. A client device with client index i may be represented as binary value $b_i$ at position i of a binary vector b. Bit $b_k$ may be set to one if a client device of client index k is selected by the server. Hence, if a client device receives the binary vector it may determine that the bit at position k is set, the client device may determine that it has been selected by the server. This way, the server may signal client devices whether they have been selected by the server to participate in an aggregation process.

In an embodiment, the binary vector may be a random binary vector of weight t. Such random binary vector may be generated by: determining an initial binary vector b of weight t by setting the first t bits to one: $b_i=1$, $1 \leq i \leq t$, and all further bits to zero: $b_i=0$, $t<i \leq n$; generating a random binary vector on the basis of the initial binary vector, the generating including determining a position n in the binary vector and determining a random number r in $\{m, m+1, \ldots n\}$ and using the random number to swap binary values at positions m and r of the binary vector b.

In an embodiment, wherein the key information includes a polynomial function of degree t−1, preferably the polynomial function being a Lagrange polynomial, such that d=f(0), and a client device i is provided or is adapted to determine a secret share of the decryption key d, preferably the secret share being based on the Lagrange polynomial, more preferably the secret share being defined as $s_i * \alpha_i$, wherein $s_i = f(i)$ and wherein $\alpha_i$ is defined as:

$$\alpha_i = \Pi^t_{j=1, j \neq i} \frac{0-j}{i-j}, 1 \leq i \leq t$$

In an embodiment, the threshold homomorphic cryptosystem is an additively homomorphic cryptosystem, preferably an additive ElGamal cryptosystem.

In an embodiment, each decryption share may have the form $(g^R)^{-s_i \alpha_i}$ and each randomized encrypted private data may have the form $g^{m_i} \cdot h^{r_i}$ wherein g is a generator of cyclic group G and wherein h is defined as $g^d$.

In an embodiment, decrypting the aggregated randomized encrypted private data may include determining the product of the randomized encrypted private data and the associated decryption shares, preferably the product being defined by the expression:

$$\Pi_{i \in H}(g^{m_i} \cdot h^{r_i}) \cdot (g^R)^{-s_i \alpha_i} = g^{\Sigma_{i \in H} m_i}$$

In an embodiment, the threshold homomorphic cryptosystem is a multiplicatively homomorphic cryptosystem, preferably a multiplicative RSA cryptosystem.

In an embodiment, each randomized encrypted private data and associated decryption share may be of the form $m_i \cdot r_i \cdot E(R)^{s_i \alpha_i}$ wherein $R=(\Pi_{i \in H} r_i)^{-1}$ mod N, N being a large composite number, preferably the product of two primes; and/or, wherein decrypting the aggregated randomized encrypted private data may include: determining the product of the randomized encrypted private data and the associated decryption shares. In an embodiment, the product may be defined by the expression: $\Pi_{i \in H} m_i \cdot r_i \cdot E(R)^{s_i \alpha_i} = (\Pi_{i \in H} m_i \cdot r_i) \cdot E(R)^{\Sigma_{i \in H} s_i \alpha_i} = R \Pi_{i \in H} m_i r_i = \Pi_{i \in H} m_i$.

In a further aspect, the invention may relate to a method for enabling secure computation of aggregated private data by a server comprising: a client device identified by client index i comprising an encryption function of a homomorphic threshold cryptosystem being provided or generating key information, the key information including an encryption key e and a decryption key d of the homomorphic threshold cryptosystem; the client device generating; or, being provided with, a random value $r_i$; the client device having access to; or being provided with, the random values of the other client devices in the group; the client device receiving client information from a server, the client information including client indices identifying client devices selected by the server, the client information signalling a client device that the server would like to aggregate encrypted private data of each of the selected client devices identified in the client information; if the client device determines on the basis of the received client information that the number of client devices selected by the server includes at least t client devices, the client device, using the random values $r_i$ and the encryption function for generating randomized encrypted private data and using the random values of the selected client devices to compute a decryption share, the decryption share being computed such that decryption key d can be reconstructed by the server on the basis of t decryption shares generated by client devices identified in the client information; and, the client device transmitting the randomized encrypted private data and the decryption share to the server, the server being adapted to aggregate randomized encrypted private data of the selected client devices and decrypt the aggregated randomized encrypted private data into cleartext.

In an embodiment, the key information may include a polynomial function of degree t−1 such that d=f(0), and a client device i is able to determine $s_i$=f(i) and wherein the key information includes $\alpha_i$ wherein $\alpha_i$ is defined as:

$$\alpha_i = \Pi_{j=1, j \neq i}^{t} \frac{0-j}{i-j}, 1 \leq i \leq t$$

In an embodiment, the threshold homomorphic cryptosystem is an additively homomorphic cryptosystem, such as an additive ElGamal cryptosystem. In an embodiment, each decryption share may have an exponential form, preferably the exponential form may include the expression $(g^R)^{-s_i \alpha_i}$. In an embodiment, each randomized encrypted private data may have the form $g^{m_i} \cdot h^{r_i}$, wherein g is a generator of cyclic group G and wherein h is defined as $g^d$.

In an embodiment, the threshold homomorphic cryptosystem may be a multiplicatively homomorphic cryptosystem, such as a multiplicative RSA cryptosystem, preferably each randomized encrypted private data and associated decryption share being of the form $m_i \cdot r_i \cdot E(R)^{s_i \alpha_i}$ wherein $R=(\Pi_{i \in H} r_i)^{-1}$ mod N, N being a product of two primes.

In another aspect, the invention may relate to a server device for secure computation of private data comprising: a computer readable storage medium having computer readable program code embodied therewith, and a processor, preferably a microprocessor, coupled to the computer readable storage medium, wherein responsive to executing the first computer readable program code.

In an embodiment, the processor of the sever device may be configured to perform executable operations comprising: selecting at least t client devices from a group of client devices, wherein each client device in the group may be: identifiable by client index i; comprise an encryption function; be provided with key information including an encryption key e and a decryption key d of a homomorphic threshold cryptosystem; generate; or, be provided with, a random value $r_i$; and, have access to; or being provided with, the random values of the other client devices in the group; transmitting client information to each selected client device, the client information including client indices identifying the selected client devices, the client information signalling a client device that the server would like to aggregate encrypted private data of each of the selected client devices; receiving randomized encrypted private data and an associated decryption share from each selected client device, the decryption shares being configured such that decryption key d can be reconstructed on the basis of t decryption shares; and, aggregating the received randomized encrypted private data of the selected client devices using the homomorphic properties of the cryptosystem and using the decryption shares to decrypt the aggregated randomized encrypted private data.

In yet a further aspect, the invention may relate to a client device configured to enable a server secure computation of private data comprising: a computer readable storage medium having computer readable program code embodied therewith, the program code including an encryption function of a homomorphic threshold cryptosystem, and a processor, preferably a microprocessor, coupled to the computer readable storage medium, wherein responsive to executing the first computer readable program code.

The processor is configured to perform executable operations comprising: receiving or generating key information, the key information including an encryption key e and a decryption key d of the homomorphic threshold cryptosystem; generating or receiving a random value $r_i$ and accessing or receiving the random values of other client devices in a group of client devices; receiving client information from a server, the client information including client indices identifying client devices selected by the server from the group of client devices, the client information signalling a client device that the server would like to aggregate encrypted private data of each of the selected client devices identified in the client information; determining on the basis of the received client information that the number of client devices selected by the server includes at least t client devices, and if the client information includes the client device using the random values $r_i$ and the encryption function for generating randomized encrypted private data and using the random values of the selected client devices to compute a decryption share, the decryption share being computed such that the aggregated value can be decrypted by the server on the basis of t decryption shares generated by client devices identified in the client information; and, transmitting the randomized encrypted private data and the decryption share to the server, the server being adapted to aggregate randomized encrypted private data of the selected client devices and decrypt the aggregated randomized encrypted private data into cleartext.

The invention may also relate to an electronic online voting platform comprising a server and a plurality of client devices as describe above.

In an embodiment, each client device may be configured as an electronic voting application, wherein the application may be configured to receive a vote from a user of the voting application and to send the vote as randomized encrypted private data to the server.

In an embodiment, the server may be configured to select t electronic voting applications from the plurality of electronic voting applications and to sum the randomized encrypted private data representing the votes.

The invention may also relate to method for privacy-preserving computation of aggregated private data of a group of client devices comprising: a server selecting, preferably randomly selecting, a subgroup H of at least t client devices from a group G of n client devices, each client device in the group G: being identifiable by a client index i (i=1, . . . , n); comprising an encryption function E; being provided with key information including an encryption key e and a decryption key d of a homomorphic threshold cryptosystem; being configured to generate or being provided with a random value $r_i$ and being provided with random values $r_j$ of the other client devices of group G; the server transmitting client information to each of the client devices, the client information including a set of client indices or information to determine a set of client indices, the set of client indices identifying the at least t client devices of subgroup H that have been selected by the server, the client information signalling each client device of subgroup H that the server would like to aggregate encrypted private data of the at least t client devices; the server receiving randomized encrypted private data and an associated decryption share $d_i$ from client devices identified by the set of client indices, the decryption shares being configured such that the encrypted aggregated result can be decrypted on the basis of at least t decryption shares; the server aggregating, preferably summing or adding, the received randomized encrypted private data of the selected client devices using the homomorphic properties of the cryptosystem and using the decryption shares for decrypting the aggregated randomized encrypted private data into cleartext.

The invention may also relate to a program product comprising software code portions configured for, when run in the memory of a computer, executing any of the method steps described above.

BRIEF DESCRIPTION OF THE DRAWINGS

Aspects of the invention will be further illustrated with reference to the attached drawings, which schematically will show embodiments. It will be understood that the invention is not in any way restricted to these specific embodiments.

DETAILED DESCRIPTION

The embodiments described below improve the functionality of a computer system by providing client devices with a new ability to control access to sensitive user data held by the client devices. In particular, the embodiments provide a new functionality in a client computing device that allows the client device to limit access to encrypted versions of sensitive data so that only certain servers can gain access to the encrypted data. In particular, only a server that will aggregate the encrypted data with encrypted data from a sufficiently large number of other client devices will be given access to the encrypted data. Other servers will be prevented from gaining access to the encrypted data. Client devices have not had such control in the past and as such, the embodiments represent a significant improvement in the operation of computing devices.

Figure 1:
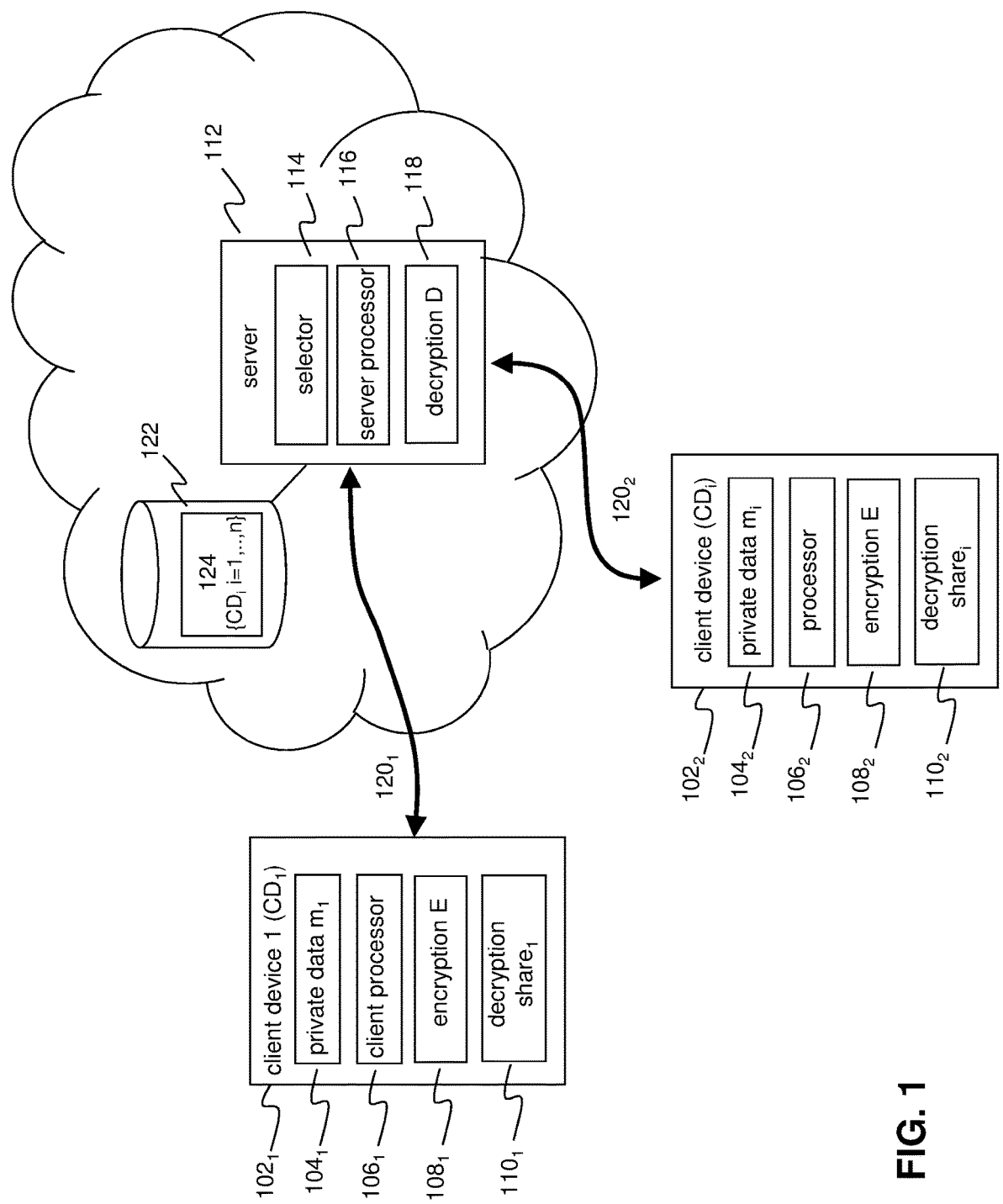
FIG. 1 schematically depicts a privacy-preserving data computing system for securely computing private data according to an embodiment of the invention.

FIG. 1 schematically depicts a privacy-preserving computing system for securely computing private data according to an embodiment of the invention. The system of FIG. 1 comprises client devices $102_{1,2}$ and at least one aggregation server 112, wherein each client device comprises a processor $106_{1,2}$ adapted to run one or more applications for collecting or generating privacy sensitive user data, e.g. medical data, financial data, user behaviour data, commercially sensitive data etc. Hereafter, privacy sensitive user data associated with client device i may be referred to in short as private data $m_i$.

A client device may be implemented as a software program executed on a user apparatus, e.g. a smart phone, a computer, a server, a (smart) television, a vehicle or any consumer or industrial electronic apparatus that is configured to process and/or generate private data.

The client devices and server may use a secure protocol that is adapted to securely sent encrypted private data to the aggregator server 112, which comprises a processor 116 adapted to process the encrypted private data in the encrypted domain. To that end, the secure protocol may be based on a homomorphic cryptosystem. The homomorphic cryptosystem may comprise an encryption function E and a decryption function D, wherein the homomorphic properties of the cryptosystem allow certain computations in the encrypted domain. For example, in an embodiment, the homomorphic cryptosystem may be an additively homomorphic crypto system having the property $E(m_1) \cdot E(m_2) = E(m_1 + m_2)$. The ElGamal cryptosystem may be designed to have additively homomorphic properties. The processing of the data by the aggregation server in the encrypted domain may include one or more computations, e.g. addition and/or multiplications, which may be part of data processing algorithm that is used by a data analytics application.

The client devices may form a group of n client devices, wherein each client device $CD_i$ (i=1, ..., n) may comprise an encryption function $E$ $108_{1,2}$ of an homomorphic cryptosystem in order to encrypt private data $m_i$ before sending the data to the aggregation server. Further, the aggregator server may comprise a decryption function D 118 of the homomorphic cryptosystem so that, after processing the encrypted private data in the encrypted domain, it can access the result of the processing by decrypting it.

The homomorphic cryptosystem may be configured as a so-called homomorphic threshold cryptosystem. Examples of homomorphic threshold cryptosystems are described in the article by Y. Desmedt and Y. Frankel, with title *"threshold cryptosystems"*, CRYPTO 1989, P. 308-315, Springer-Verlag. The threshold homomorphic cryptosystem is associated with key information, including public key information, e.g. a public encryption key e that is shared by the client devices and the aggregator server and secret key information including a secret decryption key d, which may be secret-shared among the client devices. Each client device i may be provided with a decryption share $d_i$ of the secret decryption key d, wherein the sum of all key shares forms the secret decryption key: $d = \Sigma_i d_i$.

A storage medium 122, e.g. a database, connected to the aggregation server may comprise client information 124 regarding client devices that may participate in the aggregation process. To enable the aggregation server to identify individual client devices, the client information may include client identifiers $\{CD_i\}$ for uniquely identifying each client device. A client device may be associated with an index i, preferably a countable index i, (i.e. a quantity which can take on a set of integer values and is used to designate one out of a number of possible values associated with this value). This index may hereafter be referred to as a client index. It allows a server to select of a subgroup H of client devices from a group G of n client devices and signal client devices of the selected subgroup.

For example, group G may be associated with client indexes i {1,2, . . . ,30} and a selection of a subgroup H of 7 client devices may be signalled by selecting, e.g. randomly, seven client indices {3,5,10,11,15,29}.

In a further embodiment, a binary vector of n elements $b_i$ (i=1, . . . , n) may be used to signal selection of subgroup H of client devices. A client device with client index i may be represented as binary value $b_i$ at position i of a binary vector b. Bit $b_k$ may be set to one if a client device of client index k is selected by the server. Hence, if a client device receives the binary vector it may determine that the bit at position k is set, the client device may determine that it has been selected by the server. This way, the server may signal client devices whether they have been selected by the server to participate in an aggregation process.

In an embodiment, the binary vector may be a random binary vector of weight t. Such random binary vector may be generated by: determining an initial binary vector b of weight t by setting the first t bits to one: $b_i=1$, $1 \le i \le t$, and all further bits to zero: $b_i=0$, $t < i \le n$; generating a random binary vector on the basis of the initial binary vector, the generating including determining a position n in the binary vector and determining a random number r in {m, m+1, . . . n} and using the random number to swap binary values at positions m and r of the binary vector b.

As will be explained hereunder in more detail, the client index may be used by the system to efficiently generate part of the key information of the homomorphic threshold cryptosystem.

The data computing system may use a secure protocol between the client devices and the aggregation server wherein the secure protocol is based on a threshold homomorphic cryptosystem. The secure protocol is configured as a privacy-preserving protocol allowing a server processor 116 to securely aggregate private data $m_i$ of at least t client devices from a group of n client devices without learning the individual private data $m_i$ and without leaking information of user inputs to another client device. The aggregation server may include a selector 114 for selecting a group G of client devices on the basis of the client information that is stored in the storage medium.

The secure protocol may be adapted to supply proof to the client devices that the server complies with the promise to only process a user input it receives from a client device without the need of calculating and communicating zero-knowledge proofs to the client device as known from the prior art.

Figure 2:
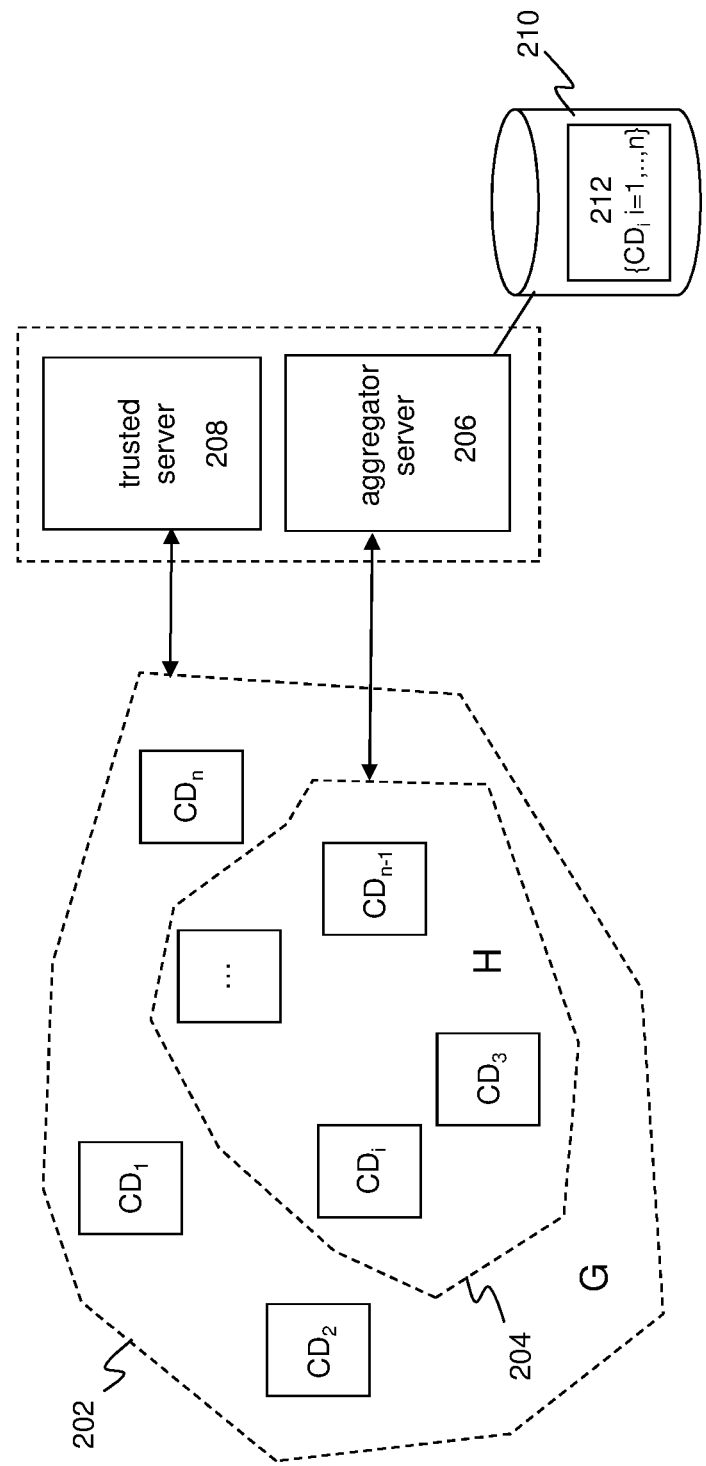
FIG. 2 schematically depicts a key distribution system according to an embodiment of the invention.

FIG. 2 schematically depicts a key distribution system according to an embodiment of the invention. In particular, FIG. 2 depicts a key distribution system that is adapted for use by the privacy-preserving computing system as described with reference to FIG. 1. The key distribution system in FIG. 2 may include a trusted server 208 associated with the aggregation server, wherein the trusted server is adapted to generate and distribute key information associated with a homomorphic threshold cryptosystem to a group G 202 of n client devices $CD_i$ (i=1, . . . , n). The aggregation server may select a group of client devices so that it can request private data from the client devices and process it. The trusted server may be configured to generated key information including a public encryption key e and key shares $d_i$, wherein the sum of all key shares forms the secret description key: $d=\Sigma_i d_i$. The trusted server may be configured to distribute the key information to each client device.

Instead of a trusted server, other key distribution schemes may be used, e.g. the key information may be generated and distributed in a decentralized (distributed way), using for example a peer-to-peer protocol, e.g. the well-known BitTorrent protocol or a derivative thereof.

In an embodiment, the aggregation server 208 may select a group G of client devices and provide client identifiers and client indices of the selected group to the secure server so that it is able to generate and distribute the key information to the selected group of client devices. Alternatively, the aggregation server may provide the trusted server with information for constructing or generating the client identifiers and the client indices of the selected group of client devices. The aggregator server 208 may be provided with the client IDs of the group of client devices so that it can select a subgroup H of client devices from the group G of client devices for which it would like to process the private data.

For example, in an embodiment, the processing of the private data may include computing an aggregated result of private data of individual client devices received by the aggregation server, such as the sum $\Sigma_{i \in H} m_i$ of the private data of subgroup H. The amount of client devices in subgroup H may be smaller or equal to the amount of client devices in G. The aggregator server (or the trusted server) may inform each client device in the subgroup H about other client devices that are participating in the aggregation process. To that end, each client device in subgroup H may be provided with group information, e.g. client identifiers or associated client indices, about all other client devices in subgroup H. In an embodiment, the server may transmit the group information, e.g. client identifiers and/or the associated client indices or information for generating client identifiers and/or associated client indices, in a request to the client devices using a suitable protocol, e.g. the HTTP protocol or the like.

In an embodiment, the reception of the group information may signal a client device in subgroup H that the aggregation server would like to receive encrypted private data from all client devices of subgroup H and that it promises to compute a predetermined aggregated result on the basis of the encrypted private data of subgroup H.

As will be described hereunder in more detail, the group information may be used to provide a client device with information that the aggregator server indeed used the private data, e.g. a vote, as input to the aggregation process.

In an embodiment, the client device may be an electronic voting application that may be executed on a mobile communications device, e.g. a smart phone. In such situation, a group of voters participating in an online voting scheme may register with a website of an electronic voting platform and download an electronic voting application, that is adapted to security communicate with one or more severs in the network. Before downloading the application, the client device may be authenticated and a predetermined client identifier may be assigned to each client device.

Figure 3A:
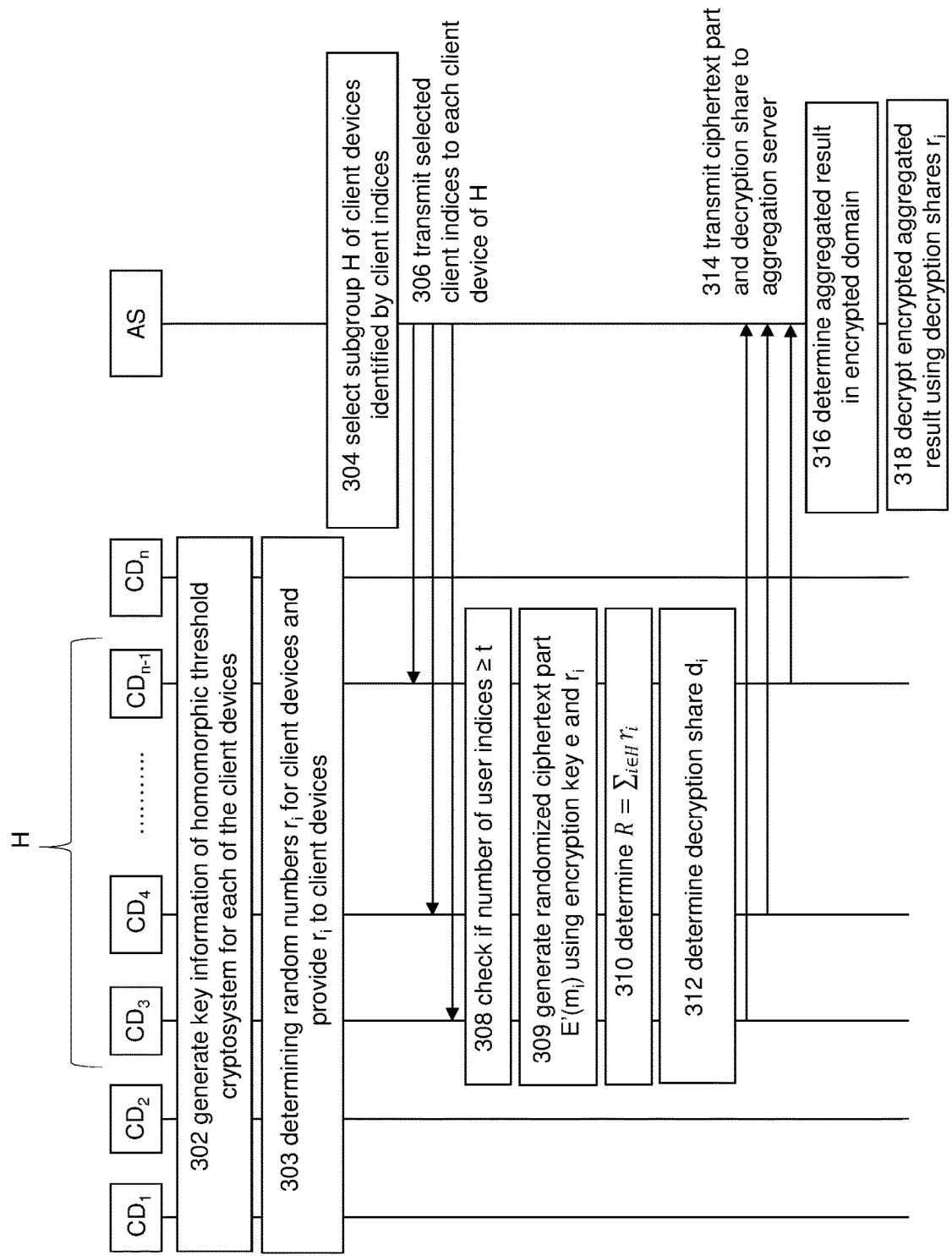
FIGS. 3A and 3B depict flow-charts of methods for privacy-preserving computations of private data according to various embodiments of the invention.

FIG. 3A depicts a flow-chart of a method for privacy-preserving computation of private data according to an embodiment of the invention. The method may be implemented in a data computing system as described with reference to FIG. 1. Such data computing system may include an aggregation server and a group G of n client devices, each being identified by a client identifier $ID_i$ and a client index i. A client device may be configured to communicate with the server using a secure protocol that is based on a homomorphic threshold cryptosystem.

In a first step 302, client devices associated with the aggregation server (e.g. client devices identified in the client information as stored in a memory storage of the aggregation server) may be provided with key information. In an embodiment, key information may be distributed to client devices using a key distribution system as described with reference to FIG. 2. Further, as part of the key information, a random number $r_i$ (i=1, . . . , n) may be generated for each client device $CD_i$ (i=1, . . . , n) (step 303).

Thereafter, the aggregation server may use the client information, e.g. a set of client indexes, to select a subgroup H of at least t client devices from the group G of n client devices that are available to the aggregator server for selection. The subgroup H of at least t client devices may be identified by client indices (step 304). Thereafter, the aggregator server may transmit the client indices or information to determine the client indices of subgroup H as client information to the client device (step 306).

In response to the reception of the set of client indices by the client devices in subgroup H, each client device in H may verify that the number of client indices is equal to or larger than t. This way, a client device is able to verify that the number of client devices that participate in the aggregation process that is executed by the aggregation server is larger than a threshold value t, i.e. |H|≥t (step 308). Here, the threshold value t may have any positive integer value larger than one. This condition ensures that the aggregator is able to decrypt the aggregated result. If the condition does not hold, the calculation is still secure, but the aggregator is not able to decrypt. In practice however, the threshold value t will be sufficiently large such that the aggregator is not able to derive any information on the private data of individual client devices from the aggregated result.

Alternatively, in an embodiment (not shown), the server may transmit the selected client indices to all the client devices of group G. In response to the reception of this information, a client device may check if the set of client indices includes the client index of the receiving client device and in case it identifies its client index in the set of client indices, it may continue to verify whether the number of client indices is equal to or larger than the threshold value.

If the client devices have ensured that the number of client indices forming subgroup H is equal to or larger than t, then each client device of H may use the encryption function E, encryption key e of the homomorphic threshold cryptosystem and the random value $r_i$ to encrypt private data $m_i$ (step 310) into a randomized ciphertext part $E'(m_i)$.

Each client device in H may receive or determine the sum of the random values $r_i$ of the individual client devices in H: $R=\Sigma_{i \in H} r_i$ (step 309). In an embodiment, the aggregation server may inform the trusted server which client devices are part of subgroup H so that it can determine R and transmit R to all client devices in H. Alternatively, each client device in H may send (e.g. broadcast) $g^{r_i}$ to all other client devices in H so that client devices of H can determine $g^R$ respectively.

Each client device of subgroup H may use the key information and R or $g^R$ to determine a decryption share $d_i$ (step 312), which the aggregator server needs for decrypting the aggregated value.

In an embodiment, the decryption share $d_i$ may be based on a polynomial function of degree t−1. The polynomial function may be a Lagrange polynomial of degree t−1 which is configured such that d=f(0). A client device i may be provided with information associated with the decryption share $d_i$.

In an embodiment, information regarding the decryption share $d_i$ may include $s_i$ and $\alpha_i$, wherein $s_i$ may be a point on the polynomial that is provided to client device i (i.e. $s_i$=f(i)) and wherein $\alpha_i$ may be a Lagrange polynomial for client device i that is evaluated at X=0:

$$\alpha_i = \Pi_{j=1, j \neq i}^{t} \frac{0-j}{i-j}, 1 \leq i \leq t.$$

Thereafter, each client device may send a randomized ciphertext part $E'(m_i)$ and decryption share $d_i$ of the homomorphic threshold cryptosystem to the aggregation server (step 314). In an embodiment, the encrypted private data and the decryption share may be sent to the server in an HTTP response message.

The aggregator server may use the randomized ciphertext parts $E'(m_i)$ (i=1, . . . , n), i.e. the encrypted private data, of the client devices for executing an arithmetic operation in the encrypted domain (step 316). For example, in an embodiment, the aggregator server may determine a sum of the private data of each client device in H in the encrypted domain: $E'(\Sigma_{i \in H} m_i)$. To that end, the aggregation server may use the homomorphic properties! in this case the additive homomorphic properties, of the threshold cryptosystem. In another embodiment, a multiplicative homomorphic threshold cryptosystem may be used for determining a product of user inputs.

The aggregator server may combine at least t decryption shares or—if the threshold value t is equal to the number of client devices in H—all decryption shares received from the selected client devices into a decryption key d that may be used to decrypt the aggregated randomized ciphertext parts $E'(\Sigma_{i \in H} m_i)$. This way, the aggregation server is able to obtain the decrypted aggregated result, e.g. the sum, of the individual private data of client devices in subgroup H (step 318).

For the aggregator sever it is not possible to cheat the client devices of H because if it tries to aggregate private data of less than t client devices, it will not be able to decrypt the encrypted aggregated amount, e.g. the sum or product, of the private data of the individual client devices. Furthermore, if the number of client devices is selected to be equal to the threshold t, the client devices have the guarantee that during the aggregation process their private data are taken into account by the aggregator. This guarantee is provided without the need to calculate computational intensive zero-knowledge-proofs as is required in prior art schemes.

Figure 3B:
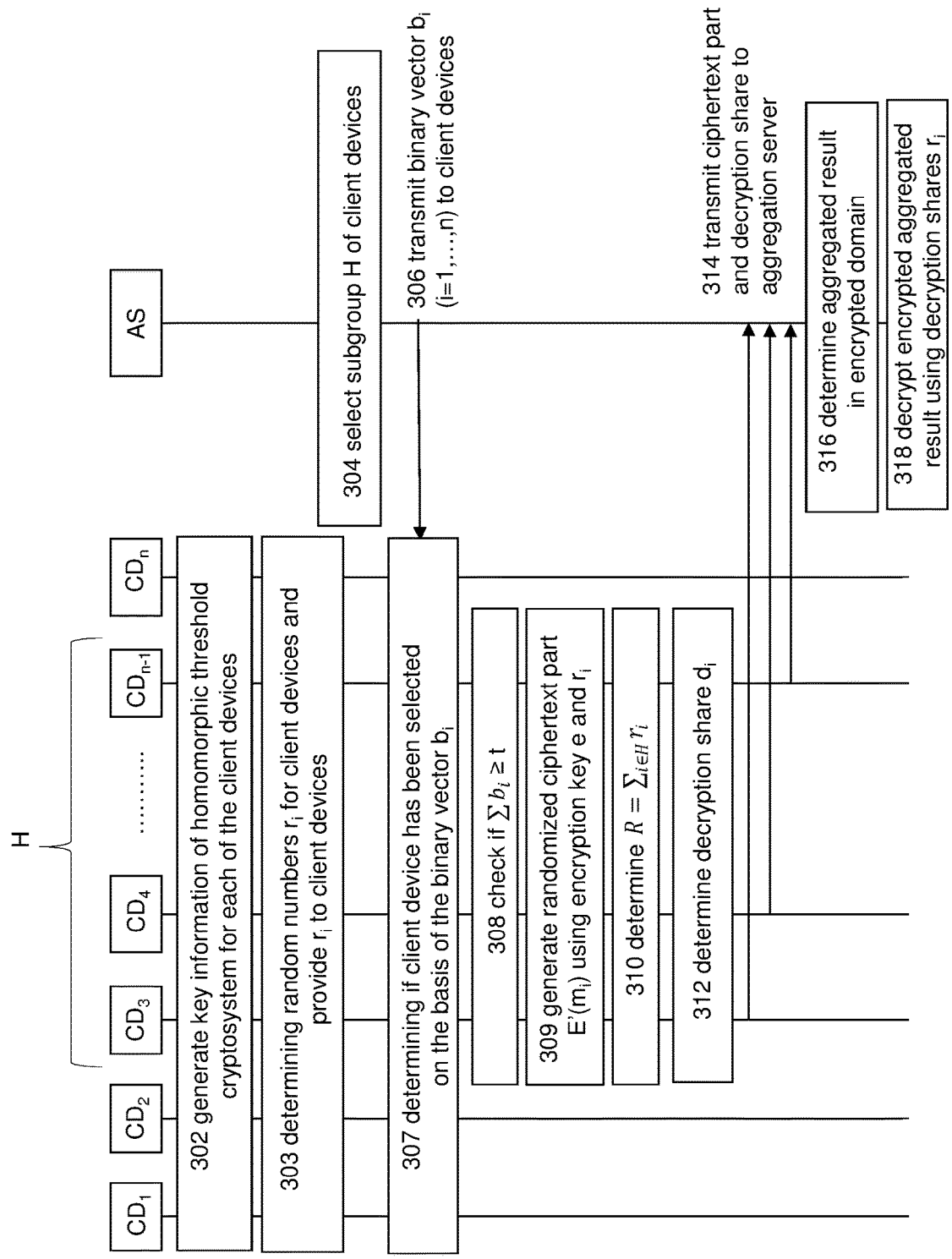

FIG. 3B depicts a flow-chart of a method for privacy-preserving computation of private data according to another embodiment of the invention. This method is identical to the one described with reference to FIG. 3A, however in this embodiment, the aggregation server may select a subgroup H (step 304) of at least t client devices using a binary vector $b_i$ (i=1, . . . n) of weight t. Such binary vector may be used to identify selected client devices, wherein a client device with client index k may be represented by a binary element $b_k$. This value may be set to one in order to signal that client device k has been selected by the server. All n client devices in G may be associated with a binary element $b_i$ (i=1, . . . , n) wherein upon selection of the subgroup H by the aggregation server at least t of the binary elements may be set to one.

The binary vector may be transmitted (broadcast) as client information by the server to all client devices of group G (step 306). Upon reception of the binary vector, a client device of client index k may check the bit at position k ($b_k$) of the binary vector in order to determine if this bit is set to one. If this is the case, the client device may determine that the server would like to receive encrypted private data. Before generating a ciphertext the client device may first determine the weight of the binary vector. If the weight is equal to or larger than t, the client device may verify that the subgroup H selected by the server is sufficiently large. Thereafter, steps 309-316 may be executed in a similar way as described with reference to FIG. 3A.

In an embodiment, the homomorphic threshold cryptosystem used in the secure protocol of FIG. 3 may be an additive threshold ElGamal cryptosystem.

In a conventional additive ElGamal cryptosystem, private data m of a client device may be encrypted by a randomized ciphertext E'(m) including the following values:

$$E'(m)=(g^r, g^m \cdot h^r),$$

Here, g is a generator of a cyclic group $G_q$, h is defined as $g^d$ wherein d is the decryption key. The values g and h may be regarded as public encryption key e. Further, r is a large freshly generated random number. Such randomized ciphertext E(m) may be decrypted by calculating:

$$D(g^r, g^m \cdot h^r) = (g^m \cdot h^r) \cdot (g^r)^{-d} = g^m,$$

wherein d is a private decryption key. This way, the private data m can be retrieved from $g^m$ using a table lookup (wherein m should not be too large). This version of the ElGamal cryptosystem, sometimes referred to as the additive ElGamal cryptosystem, is additively homomorphic, namely $E(m_1) \cdot E(m_2) = E(m_1 + m_2)$.

In a threshold ElGamal cryptosystem, the decryption key d may be secret-shared among n users, wherein each user knows or is able to determine its decryption share $d_i$ and wherein the sum of the decryption shares result in decryption key $d=\Sigma_i d_i$.

During the generation of the key information of the cryptosystem, a polynomial f of degree t−1 may be determined wherein the decryption key is equal to the function evaluated in zero: d=f(0). Each user i may be provided with precisely one value of the polynomial f, i.e. $s_i$=f(i). The threshold cryptosystem is configured such that the combined decryption information of at least t users is needed in order to decrypt a randomized ciphertext E'(m). In other words, E'(m) can be decrypted on the basis of the combined decryption information, if and only if, decryption information from at least t users can be accessed.

When the subgroup H comprises t client devices H= {1,2, . . . , t}, threshold decryption may be implemented on the basis of a polynomial $f_H$ of degree t−1, which may be constructed such that $f_H(i)=s_i$ for i∈H, using Lagrange interpolation:

$$f_H(x) = \sum_{i=1}^{t} s_i \prod_{j=1, j \neq i}^{t} \frac{x-j}{i-j}$$

The polynomial f depends on H in the sense that client device i is allowed to know only one function value, namely the polynomial f evaluated at i, which is equal to $s_i$. Nobody knows the decryption key $d=f_H(0)$. The decryption key can be derived when f is known, e.g. when t points on the polynomial are known.

It can be shown that the decryption key is equal to the polynomial value at x=0: $d=f_H(0)$, and therefore $(g^r)^{-d} = \Pi_{i=1}^{t}(g^r)^{-s_i \alpha_i}$, where $$\alpha_i = \Pi_{j=1, j \neq i}^{t} \frac{0-j}{i-j}, 1 \leq i \leq t.$$

Hence, when a client device i is provided with value $g^r$, it may determine the decryption share $(g^R)^{-s_i \alpha_i}$ and when combining the decryption shares from all client devices in H, this combined value may be used in order to obtain $(g^r)^{-d}$, and consequently decrypt the aggregated value.

The threshold ElGamal cryptosystem as described above may be adapted to provide an efficient protocol between the aggregated server and the client devices for securely computing private data.

In an embodiment, the aggregator server may be interested in determining an aggregated result (e.g. a superposition and/or a multiplication) of private data of all client devices in H. Instead of using computationally and communication intensive zero-knowledge proofs known from the prior art in order to show that the aggregator server indeed used the private data of each client device, the following privacy preserving protocol may be used.

In this protocol, each client device i of a group of client devices $CD_i$ (i=1, . . . , n) may be provided with key information of the threshold cryptosystem, in this example the ElGamal cryptosystem including key information $g,h,s_i$. Further, each client device may generate or be provided with a random value $r_i$, wherein $R=\Sigma_{i \in H} r_i$. The key information, including the random values may e.g. be generated and distributed by a trusted server as described with reference to FIG. 2.

The aggregator may then select a subgroup H of client devices from the general group G of n client devices wherein the number of client devices is equal or larger than a threshold value t, preferably equal to the threshold value t. The aggregator server may send "proof" to the client devices in H that it will aggregate private data of at least t client devices in H. The proof may include the client indices or information on the client indices of the client devices in subgroup H.

If a client device in H accepts this proof, it may send only a randomized ciphertext part $E'(m_i)=g^{m_i} \cdot h^{r_i}$ to the aggregator server, instead of the "conventional" ciphertext $E'(m_i)=(g^{r_i}, g^{m_i} \cdot h^{r_i})$. Further, each client device i sends the value $g^{r_i}$ to (at least) all other client devices in the group. Alternatively, during the generation and distribution of the key information to client devices, a trusted server may also distribute random values $g^{r_i}$ of each client device to all other client devices in G. A client device may then use the client indices of H in order to determine $g^R$. Thus, each client device i that participates in the aggregation process may verify that |H|≥t, and calculate $g^R = \Pi_{i \in H} g^{r_i}$ on the basis of the information received from the other client devices or the trusted server. Each client device i may use the key information and the random value $r_i$ to compute a decryption share $(g_R)^{-s_i \alpha_i}$ and send the decryption share to the aggregation server.

The aggregator server may sum the received randomized ciphertext parts of the client devices in the group by calculating:

$$\Pi_{i \in H}(g^{m_i} \cdot h^{r_i}) = g^{\Sigma_{i \in H} m_i} \cdot h^R$$

where $R=\Sigma_{i \in H} r_i$.

As the aggregator server has received the decryption shares from all client devices in H, the aggregator sever is able to decrypt and obtain $\Sigma_{i \in H} m_i$. If the aggregator server tries to cheat with H, and aggregate less than t user inputs, it will end up with $(g^R)^{-d}$ for some R'≠R, and thus will not be able to decrypt the aggregated result.

The protocol depicted in FIG. 3 is very efficient in terms of signalling traffic as it only requires transmission of a "request" to each of the selected client devices (wherein the request includes the client indices of the selected group) and reception of a response from each client device which includes the encrypted user input and a decryption share.

Figure 4:
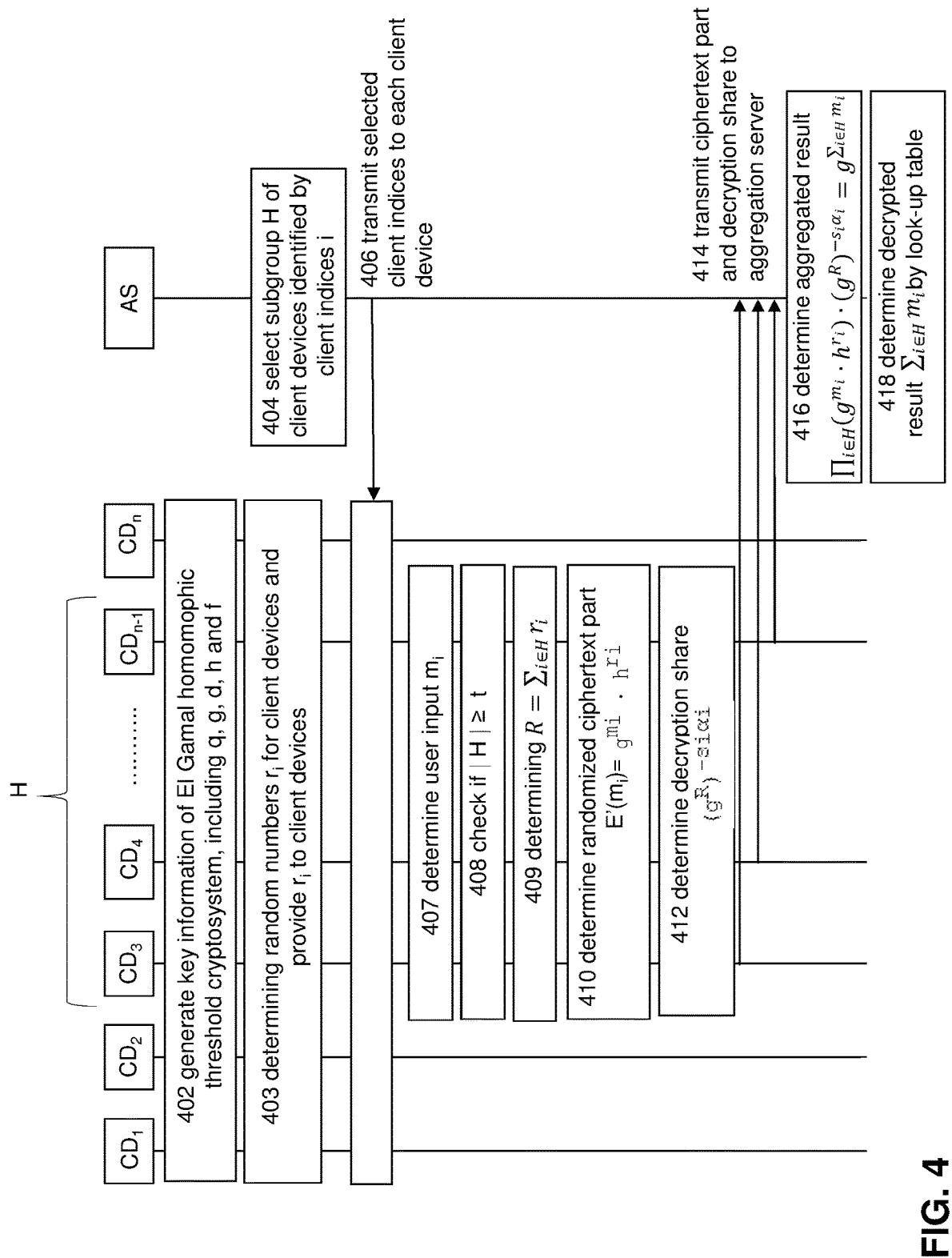
FIG. 4 depicts a flow-chart of a method for privacy-preserving computations of private data according to an embodiment of the invention.

FIG. 4 depicts a flow-chart of a method for privacy-preserving computation of private data according to another embodiment of the invention. In particular, FIG. 4 depicts a method (a protocol) for privacy-preserving computation of private data on the basis of an additive ElGamal homographic cryptosystem as explained above.

In a first step 402, key information for on a homomorphic ElGamal threshold cryptosystem may be generated for a group G of client devices. The generation of the key information may include the generation of a prime q, elements g and $h=g^d$ of $G_q$. Additionally, during the generation of the key information a polynomial f of degree t−1 may be used, wherein f is constructed such that the decryption key d of the cryptosystem is equal to the evaluation of the function in zero: d=f(0). Each of the client devices may be provided with one point of the function: $s_i=f(i)$.

Further, in an embodiment, for each aggregation round in which a group of client devices transmits a randomized ciphertext part $E'(m_i)$ to the aggregator server, new key information may be generated.

The generation of the key information may also be realized without a trusted server, e.g. using a peer-to-peer protocol, or with a trusted dealer that generates all keys and random values, and distributes it.

The aggregator sever may choose a subgroup H by selecting client indices from the group G of client devices. The subgroup H represents the group of client devices for which the aggregation server would like to aggregate private data (step 404). Thereafter, the server may inform each client device i in H which client devices form part of the subgroup H. To that end, the aggregation server may send client information, including the indices of each client device in H to all other client devices in H (step 406). The reception of the client indices may be regarded by a client device as a request from the aggregation server for aggregating private data from client devices in H. Alternatively, in another embodiment, the server may send a request for private data to each client device of subgroup H, wherein the request comprises the client device indices. In yet another embodiment, the selection of subgroup H may be signalled to the client devices using a (randomly selected) binary vector $b_i$ (i=1, . . . , n) of weight t (in a similar way as described with reference to FIG. 3B).

In response to the reception of the client indices or the request comprising the client device indices, the client device may verify that the amount of client devices in H is equal to or larger than a threshold value t of the threshold homomorphic cryptosystem, i.e. |H|≥t. If this is the case, the client device will know that the server will only be able to decrypt the encrypted private data that are sent to the server if the receiver has received the decryption shares of at least t client devices in subgroup H (step 408).

Further, if the number of client devices in H is equal to the threshold value t, the client devices will know that the aggregation server will need to receive and aggregate the decryption shares of all client devices in H. Hence, in that case, a client device will know that the aggregation server will have to use the encrypted private data that is sent by the client device to the aggregation server in the aggregation process. If the server does not use the encrypted private data in the aggregation process, the server will not be able to decrypted the aggregated result.

Each client device of subgroup H may be provided with a fresh random value $r_i$ wherein $R=\Sigma_{i \in H} r_i$ (step 409). For example, in an embodiment, a trusted server may generate a fresh random value $r_i$ for each client device of H and send the random value $r_i$, $g^{r_i}$ or $g^R$ to the other client devices of the subgroup. In an embodiment, client device i may generate a fresh random variable $r_i$, and send this value $r_i$, or the value $g^{r_i}$ to the other client devices of H.

This way, each client device i ∈ H may compute the randomized ciphertext part $g^{m_i} \cdot h^{r_i}$ (step 410). Further, in some embodiments, each client device i may use the key information to determine $g^R = \Pi_{i \in H} g^{r_i}$ and use this value to calculate the decryption share $(g^R)^{-s_i \alpha_i}$ (step 412). The randomized ciphertext part and the decryption share to the aggregator server (step 414).

The aggregator server may compute the aggregated value by computing the product of the individually encrypted user inputs of subgroup H: $\Pi_{i \in H}(g^{m_i} \cdot h^{r_i}) \cdot (g^R)^{-s_i \alpha_i} = g^{\Sigma_{i \in H} m_i}$ (step 416) and determine the decrypted aggregated value $\Sigma_{i \in H} m_i$ on the basis of a table look-up (step 418).

Hence, the protocol allows a server to decrypt the aggregated amount of private data of individual client devices in H only if the aggregation server complies with the promise of the aggregation server to exactly aggregate the private data of least t client devices of all client devices in subgroup H. The user is able to check whether the subgroup of client device selected by the aggregation server is sufficiently large order to guarantee that the aggregation server is not able to derive information from the individual user clients.

Additionally, if the aggregation server selects t client devices in H, then all client devices in subgroup H have the guarantee that the private data that they sent as cipher text parts to the aggregation sever is used in the aggregation process. Hence, in that case, no computational expensive zero-knowledge-proof computations are required in order to provide proof that the private data are taken into account by the aggregation server. Moreover, the secure protocol only requires one communication round between the client devices and the aggregation server.

Although the embodiments in this disclosure are described with reference to an ElGamal type threshold homomorphic cryptosystem, other types of homomorphic threshold cryptosystems may also be used. For example, the threshold variant of Paillier as described in Damgard I, Jurik M, *A generalisation, a simplification and some applications of Pailliers probabilistic public-key system*. In: Public key cryptography (PKC) '01. Lecture notes in computer science, Vol 1992. Springer, Berlin, pp. 119-136, 2001, may be used. The threshold variant of Paillier is additively homomorphic. Additionally, a multiplicatively homomorphic cryptosystem such as RSA may be used, such that the aggregator can compute a product $\Pi_{i \in H} m_i$ of private data of individual client devices in a secure and verifiable way.

For example, in the known RSA cryptosystem, a user input m may be encrypted using $E(m)=m^e$ mod N for some public exponent e (a public encryption key e), and an encrypted user input c may be decrypted using $D(c)=c^d$ mod N, where d is the secret exponent (a private decryption key d). Here, the number N may represent a large composite number, in particular the product of two large primes, which are kept secret. Further, the exponents e and d are related, such that $e \cdot d = 1$ mod $\varphi(N)$.

RSA is known to be multiplicatively homomorphic: $E(m_1) \cdot E(m_2) = E(m_1 \cdot m_2) \mod N$. In order to extend the RSA cryptosystem with threshold decryption, the decryption key d should be shared between all users in a similar way as described with reference FIG. 4. Hence, each client device i may be provided with a function $s_i = f(i)$, where f is a random polynomial of degree t−1, such that $d = f(0)$. For the subgroup H of client devices $CD_i$, a polynomial $f_H$ of degree t−1 may be constructed using Lagrange interpolation, such that $f_H(i) = s_i$, for each $i \in H$.

When an aggregator server would like to decrypt $c = E(\Pi_{i \in H} m_i)$, it needs to calculate the decryption information on the basis of the accumulated decryption shares $c^d = c^{f_H(0)} = c\Sigma i \in H^{s_i \alpha_i}$ where $$\alpha_i = \Pi^t_{j=1, j \neq i} \frac{0-j}{i-j}, 1 \leq i \leq t$$

(in a similar way as described above in relation to the ElGamal cryptosystem). The aggregator server is able to calculate this expression by receiving an encryption share $c^{s_i \alpha_i}$ from each client device i, $i \in H$.

However, since the conventional RSA cryptosystem is not a probabilistic encryption scheme, the aggregator may be able to cheat by computing a different cipher text c, containing less than t user inputs, and asking t users for a decryption. This may be avoided by adding randomness in the form of random values $r_i$ as described above in the case of the ElGamal cryptosystem. This way a method (a protocol) for secure computation of private data on the basis of a multiplicatively homomorphic cryptosystem like RSA can be realized.

In this embodiment, client devices in H may generate key information, including the generation of shares of the decryption key d represented by the integers $s_i$. To that end, each client device i may be provided with a function $s_i = f(i)$, where f is a random polynomial of degree t−1, such that the decryption key d that is needed by the aggregation server equals $d = f(0)$. Further, each client device i may be provided with, or may generate, a (large) random number $r_i$, and provide this random number to the other users.

The aggregator server may select a subgroup H of client devices from the total group G of n client devices for which it would like to aggregate private data. Further, the aggregator server may send information of H, e.g. the client indices of H, to all client devices in H.

Then, each client device $i \in H$ may check whether the number of client indices is equal to or larger than the threshold value t, i.e. $|H| \geq t$. If that is the case, it may compute a randomized ciphertext part $E'(m_i) = m_i \cdot r_i \cdot E(R)^{s_i \alpha_i}$ where $R = (\Pi_{i \in H} r_i)^{-1} \mod N$. In this case, the randomized ciphertext part includes a decryption part $s_i$. The client device may subsequently send the encryption part to the aggregation server.

This way, the aggregator server may receive the randomised ciphertext parts for all client devices in H, and multiply them. This way, the aggregator obtains $\Pi_{i \in H} m_i \cdot r_i \cdot E(R)^{s_i \alpha_i}$, which equals the decrypted aggregated result $(\Pi_{i \in H} m_i \cdot r_i) \cdot E(R)^{\Sigma_{i \in H} s_i \alpha_i} = R \Pi_{i \in H} m_i \cdot r_i = \Pi_{i \in H} m_i$. If the aggregator tries to combine private data of client devices that are not part of H, the output will be random and useless.

The systems and methods for privacy-preserving computation of private data as described in this application are particular useful for implementation in data analytics application which require the processing of large amounts of privacy sensitive data. An example of such data analytics application may be a secure online voting platform, wherein a group of participants (voters) may register with the platform and install an electronic voting application on their computer or mobile device. The electronic voting application (a client device) may be configured to communicate with an aggregation server of the online voting system using the protocol as described with reference to the figures in this application.

When the aggregation server selects a number of client devices that is equal to the threshold value t of the homomorphic threshold cryptosystem, a client device knows that if it receives information that the number of client devices (in particular the client indices) that participate in the aggregation process is equal to the threshold value t, that the vote sent to the aggregation server will be securely aggregated by the server while, the privacy of each of the client devices is guaranteed.

The systems and methods described in this application may be used in any data analytics application that requires an aggregated result (e.g. a sum and/or product) of private data of individual users. For example, possible data analytics applications may include the processing of medical data, e.g. online processing of clinical data or medical records of patients, processing data of voting and secret ballot schemes, processing metrics in television and multimedia applications (e.g. audience ratings of channel usage in television broadcast or streaming applications), processing of financial data of commercial and/or institutional organisations, etc.

Figure 5:
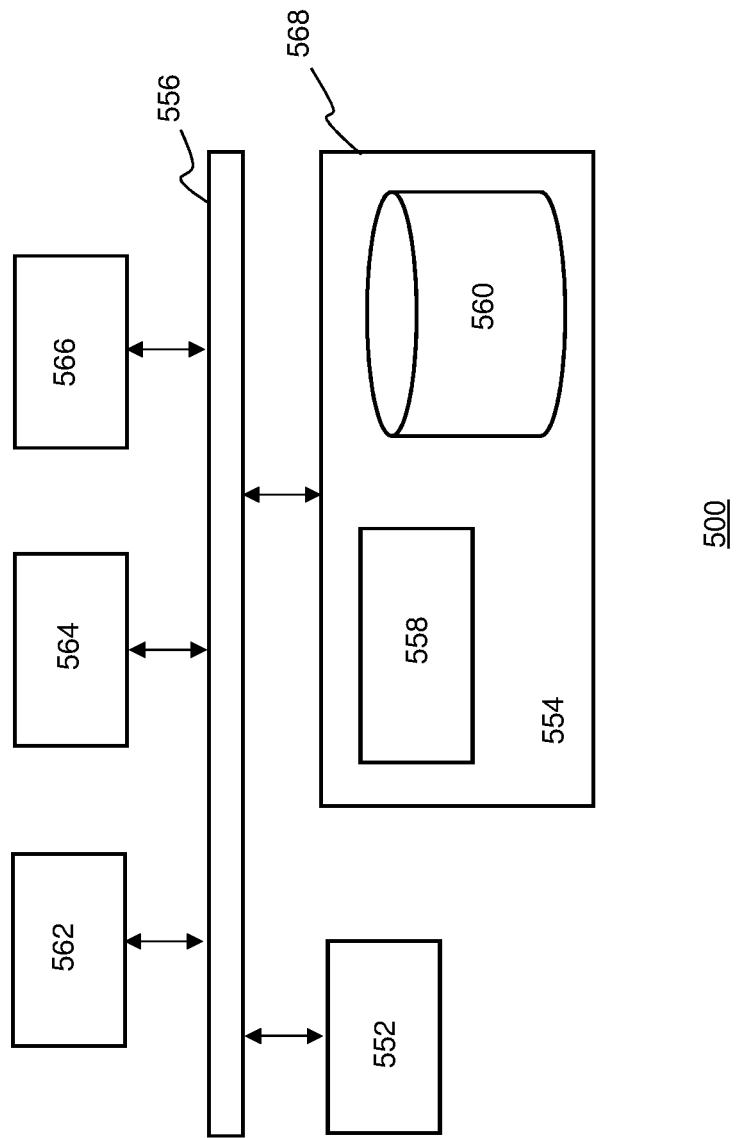
FIG. 5 is a block diagram illustrating an exemplary data computing system that may be used for executing methods and software products described in this disclosure.

FIG. 5 is a block diagram illustrating exemplary data processing systems described in this disclosure. Data processing system 500 may include at least one processor 502 coupled to memory elements 504 through a system bus 506. As such, the data processing system may store program code within memory elements 504. Further, processor 502 may execute the program code accessed from memory elements 504 via system bus 506. In one aspect, data processing system may be implemented as a computer that is suitable for storing and/or executing program code. It should be appreciated, however, that data processing system 500 may be implemented in the form of any system including a processor and memory that is capable of performing the functions described within this specification.

Memory elements 504 may include one or more physical memory devices such as, for example, local memory 508 and one or more bulk storage devices 510. Local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from bulk storage device 510 during execution.

Input/output (I/O) devices depicted as input device 512 and output device 514 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 516 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 550.

As pictured in FIG. 5, memory elements 504 may store an application 518. It should be appreciated that data processing system 500 may further execute an operating system (not shown) that can facilitate execution of the application. Application, being implemented in the form of executable program code, can be executed by data processing system 500, e.g., by processor 502. Responsive to executing application, data processing system may be configured to perform one or more operations to be described herein in further detail.

In one aspect, for example, data processing system 500 may represent a client data processing system. In that case, application 518 may represent a client application that, when executed, configures data processing system 500 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 518, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of aspects of the present invention have been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for privacy-preserving computation of aggregated private data of a group of client devices for use in a single-request followed by a single-response type scheme, the method comprising:
   selecting, by a server, a subgroup H of at least t client devices from a group G of n client devices, the subgroup H comprising fewer client devices than the group G, each client device in the group G:
   being identifiable by a client index i (i=1, . . . , n);
   comprising an encryption function E;
   being configured to generate or being provided with key information including an encryption key e and a decryption key d of a homomorphic threshold cryptosystem;
   being configured to generate or being provided with a random value $r_i$; and
   having access to or being provided with random values $r_i$ of the other client devices in at least the subgroup H or having access to or being provided with an aggregate R of the random values $r_i$ of the client devices in the subgroup H;
   transmitting, by the server, client information to each of the client devices in a single-request to each client device, the client information including a set of client indices or information to determine a set of client indices, the set of client indices identifying the at least t client devices of subgroup H that have been selected by the server, the client information signaling each client device of subgroup H that the server would like to aggregate encrypted private data of only the at least t client devices of subgroup H;
   receiving, by the server, a response including a randomized single-response encrypted private data and an associated decryption share di in a single-response to the single-request from each client device identified by the set of client indices, where the single-response from each client is received directly following the single-request from the server, the decryption shares being configured such that the encrypted aggregated result can be decrypted on the basis of at least t decryption shares; and
   after the server transmits the single-request only once to each client device identified by the set of client indices and receives the single-response encrypted private data only once from each client identified by the set of client indices, aggregating, by the server, the received randomized single-response encrypted private data of the selected client devices using homomorphic properties of the cryptosystem and using the decryption shares for decrypting the aggregated randomized single-response encrypted private data into a cleartext representation of the aggregated private data.

2. The method according to claim 1 wherein the key information includes a polynomial function of degree t−1, such that d=f(0), and a client device i is provided with or is adapted to determine the decryption share di of the decryption key d.

3. The method according to claim 2 wherein the threshold homomorphic cryptosystem is based on an additively homomorphic cryptosystem.

4. The method according to claim 3 wherein each decryption share $d_i$ is of the form $(g^R)^{-s_i \cdot \alpha_i}$ and wherein each randomized single-response encrypted private data is of the form $g^{m_i} \cdot h^{r_i}$ wherein g is a generator of cyclic group G and wherein h is defined as $g^d$.

5. The method according to claim 3 wherein decrypting the aggregated randomized single-response encrypted private data includes determining a product of the randomized single-response encrypted private data and the associated decryption shares.

6. The method according to claim 2 wherein the threshold homomorphic cryptosystem is based on a multiplicatively homomorphic cryptosystem.

7. The method according to claim 6 wherein each randomized single-response encrypted private data is of the form $m_i \cdot r_i \cdot E(R)^{s_i \alpha_i}$ wherein the decryption share $d_i$ is included in the encrypted private data and wherein $R = (\Pi_{i \in H} r_i)^{-1} \mod N$, N being a large composite number; and/or, wherein decrypting the aggregated randomized single-response encrypted private data includes determining a product of the randomized single-response encrypted private data and the associated decryption shares.

8. A method for enabling privacy-preserving computation of aggregated private data of a group G of n client devices for use in a single-request followed by a single-response type scheme, the method comprising:

providing a client device identified by client index i comprising an encryption function of a homomorphic threshold cryptosystem with key information or generating, by the client device, key information, wherein the key information includes an encryption key e and a decryption key d of the homomorphic threshold cryptosystem;

generating, by the client device, or being provided with a random value $r_i$ and having access to, or being provided with, the random values of the other client devices in at least a subgroup H of at least t client devices from the group G, the subgroup H comprising fewer client devices than the group G, or having access to or being provided with an aggregate R of the random values $r_i$ of the client devices in the subgroup H;

receiving, by the client device, client information in a single-request only once from a server, the client information including client indices identifying client devices selected by the server, the client information signaling a client device that the server would like to aggregate encrypted private data of only each of the selected client devices in the subgroup H identified in the client information;

if the client device determines on the basis of the received client information that the number of client devices selected by the server includes at least t client devices, using, by the client device, the random values $r_i$ and the encryption function for generating randomized single-response encrypted private data to the single-request and using, by the client device, the random values of the selected client devices to compute a decryption share, the decryption share di being computed such that the aggregated value can be decrypted by the server on the basis of t decryption shares generated by client devices identified in the client information; and transmitting, by the client device, the randomized encrypted private data and the decryption share to the server in a single-response only once directly following the single-request from the server, the server being adapted to aggregate randomized single-response encrypted private data of the selected client devices and decrypt the aggregated randomized single-response encrypted private data into a cleartext representation of the aggregated private data based on the randomized single-response encrypted private data and the decryption share being transmitted to the server in the single-response only once.

9. The method according to claim 8 wherein the key information includes a polynomial function of degree t−1, such that d=f(0), and a client device i is provided with or is adapted to determine the decryption share di of the decryption key d.

10. The method according to claim 9 wherein the threshold homomorphic cryptosystem is based on an additively homomorphic cryptosystem, such as an additive ElGamal cryptosystem.

11. The method according to claim 9 wherein the threshold homomorphic cryptosystem is based on a multiplicatively homomorphic cryptosystem, such as a multiplicative RSA cryptosystem.

12. A server device adapted for privacy-preserving computation of aggregated private data of a group of client devices for use in a single-request followed by a single-response type scheme, the server device comprising:

a computer readable storage medium having computer readable program code embodied therewith, and a processor, coupled to the computer readable storage medium, wherein responsive to executing the computer readable program code, the processor is configured to perform executable operations comprising:

selecting a subgroup H of at least t client devices from a group G of n client devices, the subgroup H comprising fewer client devices than the group G, each client device in the group G:

being identifiable by a client index i (i=1, . . . , n);

comprising an encryption function E;

being configured to generate or being provided with key information including an encryption key e and a decryption key d of a homomorphic threshold cryptosystem;

being configured to generate or being provided with a random value $r_i$ and having access to or being provided with random values $r_i$ of the other client devices in at least the subgroup H or having access to or being provided with an aggregate R of the random values $r_i$ of the client devices in the subgroup H;

transmitting client information to each of the client devices in a single-request to each client device, the client information including a set of client indices or information to determine a set of client indices, the set of client indices identifying the at least t client devices of subgroup H that have been selected by the server, the client information signaling each client device of subgroup H that the server would like to aggregate encrypted private data of only the at least t client devices of subgroup H;

receiving randomized encrypted private data and an associated decryption share di in a single-response from each client device identified by the set of client indices, where the single-response from each client is received directly following the single-request from the server, the decryption shares being configured such that the encrypted aggregated result can be decrypted on the basis of at least t decryption shares; and after the server transmits the single-request only once to each client device identified by the set of client indices and receives the single-response only once from each client identified by the set of client indices, aggregating the received randomized single-response encrypted private data of the selected client devices using homomorphic properties of the cryptosystem and using the decryption shares for decrypting the aggregated randomized single-response encrypted private data into a cleartext representation of the aggregated private data.

13. A client device configured to communicate with a server for privacy-preserving computation of aggregated private data of a group G of n client devices for use in a single-request followed by a single-response type scheme, the client device comprising:
- a computer readable storage medium having computer readable program code embodied therewith, the computer readable program code including an encryption function of a homomorphic threshold cryptosystem, and a processor, coupled to the computer readable storage medium, wherein responsive to executing the computer readable program code, the processor is configured to perform executable operations comprising:
- receiving or generating key information, the key information including an encryption key e and a decryption key d of the homomorphic threshold cryptosystem;
- generating or receiving a random value $r_i$ and receiving random values $r_i$ of client devices of at least a subgroup H of at least t client devices from the group G of n client devices, the subgroup H comprising fewer client devices than the group G, the client devices being associated with a client index i (i=1, . . . , n);
- receiving client information in a single-request only once from the server, the client information including a set of client indices or information to determine a set of client indices, the set of client indices identifying the subgroup H of client devices that have been selected by the server from the group G of n client devices, the client information signaling the client device that the server would like to aggregate encrypted private data of only the at least t client devices of subgroup H;
- determining on the basis of the set of client indices or the information to determine the set of client indices that the number of client devices of subgroup H selected by the server includes at least t client devices;
- if the client information includes at least t client devices, using the random value $r_i$ of the client device and the encryption function to generate randomized single-response encrypted private data and using the random values $r_i$ of the client devices as identified by the set of client devices to compute a decryption share $d_i$, the decryption shares being configured such that the encrypted aggregated result can be decrypted on the basis of at least t decryption shares; and
- transmitting the randomized single-response encrypted private data and the decryption share di to the server in a single-response only once directly following the single-request from the server, the server being adapted to aggregate randomized single-response encrypted private data of the selected client devices and decrypt the aggregated randomized single-response encrypted private data into a cleartext representation of the aggregated private data on the basis of the decryption shares being transmitted to the server in the single-response only once.

14. An electronic online voting platform comprising:
- a server device adapted for privacy-preserving computation of aggregated private data of a group of client devices for use in a single-request followed by a single-response type scheme, the server device comprising:
- a computer readable storage medium having computer readable program code embodied therewith, and a processor, coupled to the computer readable storage medium, wherein responsive to executing computer readable program code, the processor is configured to perform executable operations comprising:
- selecting a subgroup H of at least t client devices from a group G of n client devices, each client device in the group G:
  - being identifiable by a client index i (i=1, . . . , n);
  - comprising an encryption function E;
  - being provided with key information including an encryption key e and a decryption key d of a homomorphic threshold cryptosystem;
  - being configured to generate or being provided with a random value ri and
  - having access to or being provided with random values ri of the other client devices in at least the subgroup H or having access to or being provided with an aggregate R of the random values $r_i$ of the client devices in the subgroup H;
- transmitting client information to each of the client devices in a single-request to each client device, the client information including a set of client indices or information to determine a set of client indices, the set of client indices identifying the at least t client devices of subgroup H that have been selected by the server, the client information signaling each client device of subgroup H that the server would like to aggregate encrypted private data of the at least t client devices;
- receiving randomized encrypted private data and an associated decryption share $d_i$ in a single-response from each client device identified by the set of client indices, the decryption shares being configured such that the encrypted aggregated result can be decrypted on the basis of at least t decryption shares; and
- after the server transmits the single-request only once to each client device identified by the set of client indices and receives the single-response only once from each client identified by the set of client indices directly following the single-request from the server, aggregating the received randomized single-response encrypted private data of the selected client devices using homomorphic properties of the cryptosystem and using the decryption shares for decrypting the aggregated randomized single-response encrypted private data into a cleartext representation of the aggregated private data;
- a plurality of client devices configured to communicate with the server device for privacy-preserving computation of aggregated private data of a group of client devices, each client device comprising:
- a computer readable storage medium having computer readable program code embodied therewith, the computer readable program code including an encryption function of a homomorphic threshold cryptosystem, and a processor, coupled to the computer readable storage medium, wherein responsive to executing the first computer readable program code, the processor is configured to perform executable operations comprising:
- receiving or generating key information, the key information including an encryption key e and a decryption key d of the homomorphic threshold cryptosystem;
- generating or receiving a random value $r_i$ and receiving random values $r_i$ of client devices of the group G of n client devices, the client devices being associated with a client index i (i=1, . . . , n);
- receiving client information in the single-request only once from the server, the client information including a set of client indices or information to determine a set of client indices, the set of client indices identifying the subgroup H of client devices that have been selected by the server from a group G of n client devices, the client information signaling the client device that the server would like to aggregate encrypted private data of the at least t client devices;

determining on the basis of the set of client indices or the information to determine the set of client indices that the number of client devices of subgroup H selected by the server includes at least t client devices;

if the client information includes at least t client devices, using the random value $r_i$ of the client device and the encryption function to generate randomized encrypted private data and using the random values $r_i$ of the client devices as identified by the set of client devices to compute a decryption share $d_i$, the decryption shares being configured such that the encrypted aggregated result can be decrypted on the basis of at least t decryption shares; and transmitting the randomized single-response encrypted private data and the decryption share $d_i$ to the server in a single-response only once, the server being adapted to aggregate randomized single-response encrypted private data of the selected client devices and decrypt the aggregated randomized single-response encrypted private data into a cleartext representation of the aggregated private data on the basis of the decryption shares being transmitted to the server in the single-response only once;

wherein each client device is configured as an electronic voting application, the application being configured to receive a vote from a user of the voting application and to send the vote as randomized single-response encrypted private data to the server; and wherein the server device is configured to select t or at least t electronic voting applications from the plurality of electronic voting applications and to sum the randomized single-response encrypted private data representing the votes.

15. The method according to claim 2, wherein the polynomial function is a Lagrange polynomial, and wherein the decryption share di is based on a Lagrange polynomial.

16. The method according to claim 15, wherein the decryption share $d_i$ comprises $s_i * \alpha_i$, wherein $s_i$ is the value of the polynomial function evaluated in $s_i=f(i)$ and wherein $\alpha_i$ is defined as:

$$\alpha_i = \Pi^t_{j=1, j \neq i} \frac{0-j}{i-j}, 1 \leq i \leq t.$$

17. The method according to claim 5, wherein the product is defined by the expression:

$$\Pi_{i \in H}(g^{m_i} \cdot h^{r_i}) \cdot (g^R)^{-s_i \alpha_i} = g^{\Sigma_{i \in H} m_i}.$$

18. The method according to claim 7, wherein N is the product of two primes; and/or, wherein the product is defined by the expression:

$$\Pi_{i \in H} m_i \cdot r_i \cdot E(R)^{s_i \alpha_i} = (\Pi_{i \in H} m_i \cdot r_i) \cdot E(R)^{\Sigma_{i \in H} s_i \alpha_i} = R \Pi_{i \in H} m_i r_i = \Pi_{i \in H} m_i.$$

19. The method according to claim 9, wherein the polynomial function is a Lagrange polynomial, and wherein the decryption share di is based on a Lagrange polynomial.

* * * * *